(12) United States Patent
Chen et al.

(10) Patent No.: US 9,356,887 B2
(45) Date of Patent: May 31, 2016

(54) CONTROLLING SHARED MEMORY

(75) Inventors: Ying Chen, Beijing (CN); Yan Li, Beijing (CN); Qiming Teng, Beijing (CN); Huayong Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 13/599,501

(22) Filed: Aug. 30, 2012

(65) Prior Publication Data

US 2012/0324038 A1 Dec. 20, 2012

Related U.S. Application Data

(63) Continuation of application No. 13/400,768, filed on Feb. 21, 2012.

(30) Foreign Application Priority Data

Feb. 28, 2011 (CN) .......................... 2011 1 0047985

(51) Int. Cl.
G06F 15/167 (2006.01)
H04L 12/879 (2013.01)
G06F 9/54 (2006.01)

(52) U.S. Cl.
CPC .............. *H04L 49/901* (2013.01); *G06F 9/544* (2013.01); *G06F 15/167* (2013.01)

(58) Field of Classification Search
CPC ......... G06F 13/20; G06F 13/00; G06F 15/16; H04L 29/10
USPC ................................. 709/250, 213
See application file for complete search history.

(56) References Cited

U.S. PATENT DOCUMENTS 5,257,369 A  10/1993  Skeen
5,339,392 A   8/1994  Risberg (Continued)

FOREIGN PATENT DOCUMENTS

CA       2119152 C    10/2000
KR        170500 B1    3/1999
WO   WO 2006/004966 A2  1/2006

OTHER PUBLICATIONS

Krishan, et al., Optimizing Performance on Linux Clusters Using Advanced Communication Protocols: How 10+Teraflops Was Achieved on a 8.6 Teraflops Linpack-Rated Linux Cluster.

*Primary Examiner* — David Lazaro
*Assistant Examiner* — Zia Khurshid
(74) *Attorney, Agent, or Firm* — Derek S. Jennings; Patent Mining Works, LLC

(57) ABSTRACT

In view of the characteristics of distributed applications, the present invention proposes a technical solution for applying a shared memory on an NIC comprising: a shared memory configured to provide shared storage space for a task of a distributed application, and a microcontroller. Furthermore, the present invention provides a computer device that includes the above-mentioned NIC, a method for controlling a read/write operation on a shared memory of a NIC, and a method for invoking the NIC. The use of the technical solution provided in the present invention bypasses the processing of network protocol stack, avoids the time delay introduced by the network protocol stack. The present invention does not need to perform TCP/IP encapsulation on the data packet, thus greatly saving additional packet header and packet tail overheads generated from the TCP/IP layer data encapsulation.

9 Claims, 10 Drawing Sheets

(56) References Cited

U.S. PATENT DOCUMENTS

| | | |
|---|---|---|
| 5,557,798 A | 9/1996 | Skeen |
| 5,966,531 A | 10/1999 | Skeen |
| 6,338,095 B1 | 1/2002 | Yasuda |
| 7,356,026 B2 | 4/2008 | Scott |
| 7,716,667 B2 * | 5/2010 | van Rietschote et al. ......... 718/1 |
| 7,743,191 B1 | 6/2010 | Liao |
| 8,417,833 B1 * | 4/2013 | Amdahl ....................... 709/247 |
| 8,600,726 B1 * | 12/2013 | Varshney et al. ............... 703/26 |
| 2002/0172199 A1 | 11/2002 | Scott |
| 2009/0183180 A1 | 7/2009 | Nelson |
| 2010/0020818 A1 | 1/2010 | Cardona |

* cited by examiner

| Physical layer packet header | IP packet header | TCP packet header | Data | TCP packet tail | IP packet tail | Physical layer packet tail |
|---|---|---|---|---|---|---|

Fig. 2A

| Physical layer packet header | Data | Physical layer packet tail |
|---|---|---|

Fig. 2B

| Destination address | Source address | Length | DSAP AA | SSAP AA | Cntl 03 | Org code 00 | Type | Data | CRC |
|---|---|---|---|---|---|---|---|---|---|
| 6 | 6 | 2 | 1 | 1 | 1 | 3 | 2 | 38-1492 | 4 |

Fig. 7A

| Destination address | Source address | Type | Data | CRC |
|---|---|---|---|---|
| 6 | 6 | 2 | 46-1500 | 4 |

Fig. 7B

CONTROLLING SHARED MEMORY

CROSS-REFERENCE TO RELATED APPLICATION

This application is a continuation of and claims priority from U.S. patent application Ser. No. 13/400,768, filed Feb. 21, 2012, which in turn claims priority under 35 U.S.C. §119 from Chinese Patent Application No. 201110047985.X filed Feb. 28, 2011, the entire contents of both are incorporated herein by reference.

BACKGROUND OF THE INVENTION

1. Field of the Invention

The present invention generally relates to technologies for processing data on a network interface card (NIC), and specifically to an NIC, a computer device, a method for controlling a read/write operation on a shared memory on a NIC and a method for scheduling a NIC.

2. Description of Related Art

A distributed application refers to an application distributed on different computer nodes and accomplishing a task together through a network. The task can be divided into a plurality of processes, and different processes can be distributed on different computer nodes. The plural processes need to invoke each other frequently, or perform plural read/write operations on the same data. The processes of a distributed application distributed on different nodes usually perform network communications using the TCP/IP protocol. TCP/IP is a general communication protocol for supporting communications of almost all kinds of applications on the transmission layer/network layer. The TCP/IP protocol has not provided customized protocol architecture for distributed applications.

On traditional distributed computer architecture, an independent program buffer for a distributed application is allocated on each computer node. Each process of the distributed program independently performs operations on the program buffer, and performs data transmission through a TCP/IP network. According to the traditional architecture, data is required to go through multi-layered packaging before being transmitted through the network, as well as multi-layered decapsulation after being transmitted through the network. The above encapsulation and decapsulation processes result in delays of multiple times during the entire data transmission process, and cause many unnecessary system overheads.

FIG. 1 illustrates schematic diagram of a system for performing data communication between two computer nodes in the prior art. Specifically, in the example shown in FIG. 1, computer node A requests to read a piece of data from computer node B. The architecture of computer node A includes an application process A, a language runtime A, a network protocol stack A, a device driver module A, a NIC A and a program buffer A, the program buffer usually residing in the physical memory of the computer node. The computer node A can further include other devices not shown in FIG. 1, such as a CPU. The architecture of computer node B is identical with that of computer node A.

In step S1, the application process A transmits a read data request to the language runtime A through a dedicated programming interface; in step S2, the language runtime A converts the read data request into a network data transmission request, and passes it to the network protocol stack A for processing; in step S3, the network protocol stack A, after performing TCP/IP encapsulation on the data, invokes the device driver module A to initiate a direct memory access (DMA) operation of the NIC A; in step S4, the NIC A copies the address of the program buffer A to the NIC memory (not shown) on the NIC A through the DMA operation; in step S5, the NIC A transmits the content in its NIC memory to the NIC B of the other computer node B; in step S6, the NIC B generates an interrupt signal after receiving the data request packet from the NIC A, and informs the device driver module B; in step S7, the device driver module B copies the data request packet from the NIC memory of the NIC B to the program buffer B; in step S8, the device driver module B informs the network protocol stack B of the event of the arrival of the data request packet, and requests the network protocol stack B to parse the arrived data request packet; in step S9, by parsing the data request packet, the network protocol stack B learns that the content in the data request packet is a read data request, and informs the application process B by the language runtime B; in step S10, the application process B reads the data required by the computer node A, and constructs a network response notification, then invokes the language runtime B requesting to transmit the data; in step S11, the language runtime B passes the network response notification to the network protocol stack B to form a network data transmission request; in step S12, after performing TCP/IP protocol encapsulation on the data, the network protocol stack B invokes the device driver module B and indicates the address of the program buffer B in which the data to be transmitted is located to initiate the NIC B to perform a DMA operation; in step S13, the NIC B copies the data from the program buffer B to the NIC memory on the NIC B through the DMA operation; in step S14, the NIC B transmits the data to the NIC A on the computer node A; in step S15, the NIC A forms an interrupt signal after receiving the data from network, and informs the device driver module A; in step S16, the device driver module A copies the data from the NIC memory of the NIC A to the network protocol stack A; in step S17, the device driver module A informs the network protocol stack A of the data arrival event to request the network protocol stack A to parse the arrived data; in step S18, the network protocol stack A learns that the content of the data packet is a response corresponding to the read data request by parsing the data packet, and informs the application process A by the language runtime A, so as to make the application process A get the final result.

SUMMARY OF THE INVENTION

One aspect of the present invention provides a network interface card, including: a shared memory configured to provide shared storage for tasks of distributed applications, where said shared memory can be accessed by a plurality of computing nodes executing a same task; and a microcontroller configured to control read/write operations on said shared memory.

Another aspect of the present invention provides a method for controlling a read/write operation on a shared memory of a network interface card, where the shared memory is configured to provide shared storage for tasks of a distributed application, and the shared memory can be accessed by a plurality of computing nodes executing a same task, the method including: determining whether a local network interface card is configured with a shared memory supporting said read/write operation; and performing the read/write operation to the shared memory on the local network interface card when the local network interface card is configured with the shared memory supporting the read/write operation.

Another aspect of the present invention provides a method for invoking a network interface card, the method including:

providing a program buffer of a distributed application; invoking a language runtime through a dedicated interface on the language runtime; invoking a device driver module to perform physical layer encapsulation; and controlling a read/write operation on the shared memory of the network interface card.

BRIEF DESCRIPTION OF THE DRAWINGS

The accompanying drawings referenced by this description are only used to illustrate typical embodiments of the present invention, and shall not be construed as limitation to the scope of the present invention.

FIG. 2A illustrates a schematic diagram of an encapsulation structure of a data frame transmitted on a network in the prior art.

FIG. 2B illustrates a schematic diagram of an encapsulation structure of a data frame transmitted on a network according to an embodiment of the present invention.

FIG. 7A illustrates a schematic diagram of a physical layer data frame transmitted according to the RFC894 Ethernet network transmission standard.

FIG. 7B illustrates a schematic diagram of a physical layer data frame transmitted according to the RFC1042 Ethernet network transmission standard.

DETAILED DESCRIPTION OF THE PREFERRED EMBODIMENTS

Figure 1:
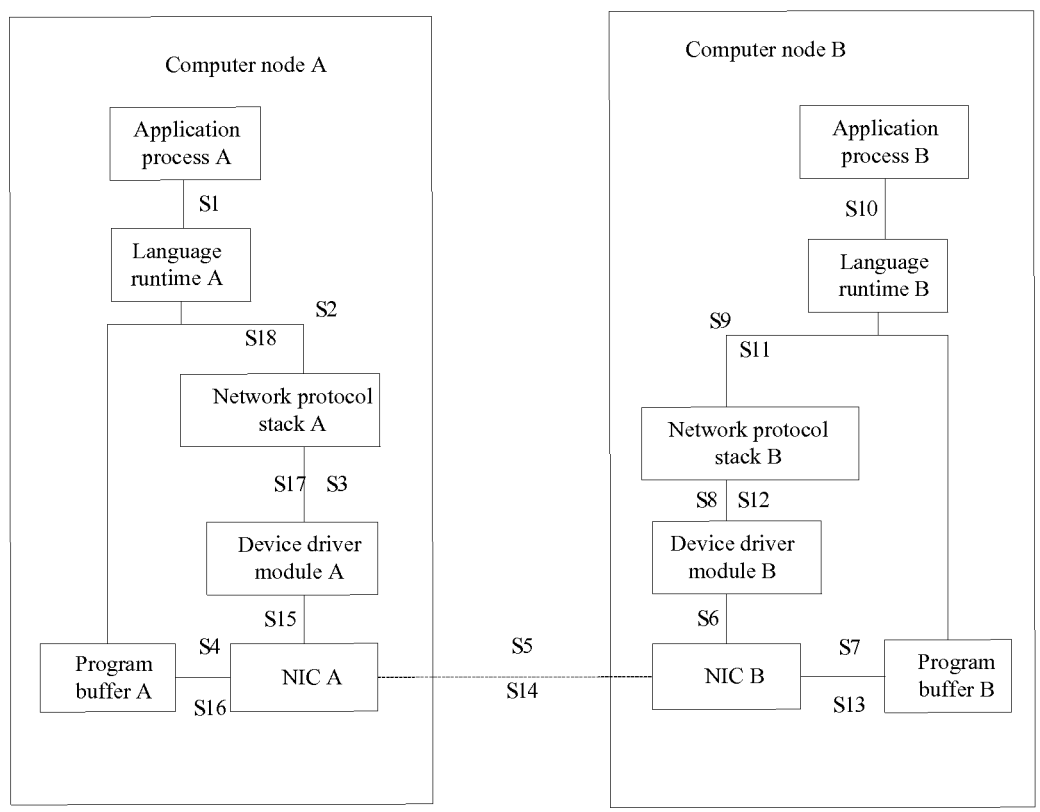
FIG. 1 illustrates a schematic diagram of a system for performing data communication between two computer nodes in the prior art.

Numerous specific details are provided in the following discussion to facilitate thorough understanding of the present invention. However, it is obvious to those skilled in the art that the understanding of the present invention can not be affected without these specific details. It should be appreciated that the use of any of the following specific terms is only for the convenience of description, and therefore, the present invention should not be limited to be used in any specific application denoted and/or implied by such terms.

The inventor of the present invention finds that the steps S8, S9, S17 and S18 have significant and unpredictable delay during the above data read process. Therein, scheduling delay of the operating system will occur in the steps S8 and S17; data receiving can be finished only when the operating system schedules the target application to run, and this delay is difficult to estimate, usually between 1~1000 milliseconds. And in the steps S9 and S17, scheduling delay of the language runtime will occur, and this can be up to several seconds in the worst case.

Besides the time delays, the whole data read process will result in a large amount of network data packet head/tail overheads, since the network protocol stack will be responsible for performing the TCP/IP encapsulation/decapsulation on the data during the entire data read process. FIG. 2A illustrates a schematic diagram of the encapsulation structure of a data frame transmitted on a network in the prior art. In the schematic diagram of FIG. 2A, it can be found that when being transmitted on the network, data go through three encapsulation processes of TCP, IP and physical layers. The TCP packet header and tail have 20 bytes in total, the IP packet header and tail have 20 bytes in total, and the physical packet header and tail have 26 bytes in total. Therefore, after being processed by the network protocol stack, if the data packet transmitted on the network has only 1 byte of original data, the finally formed network layer data frame will have 67 (20+20+26+1) bytes.

For a distributed application, it needs to perform frequent transmission and synchronization of shared data on several specific computer nodes, thus requiring performing frequent communication among the plural computer nodes and performing transmission between the program buffer and NIC memory on each computer node. Obviously, for a task of a distributed application, its main objective is to make the application processes on the computing nodes to obtain consistent data views, and to ensure the consistency of data update. TCP/IP protocol stack processing is not only unnecessary, but also brings additional processing and storage overheads. In view of the above features of a distributed application, the present invention proposes a technical solution of realizing shared memory on a NIC.

Specifically, the present invention provides a device modeled after NIC, including: a shared memory configured to provide shared storage for a distributed application, and the shared memory can be accessed by a plurality of computing nodes running a same application, as well as a microcontroller configured to control a read/write operation on the shared memory.

In addition, the present invention further provides a computer device, including: the above-described NIC, and a device driver module configured to perform physical layer encapsulation on the shared memory on the above NIC.

Additionally, the present invention further provides a method for controlling read/write operations on a shared memory of a NIC, where the shared memory is configured to provide shared storage for a distributed application, and the shared memory can be accessed by a plurality of computing nodes running the same application, the method including: determining whether the local NIC is configured with a shared memory supporting the read/write operation, and performing the read/write operation on the shared memory on the local NIC if the local NIC is configured with a shared memory supporting the read/write operation.

Furthermore, the present invention provides a method for invocating an NIC, the method including: providing a program buffer for the distributed application, invoking a language runtime through a dedicated interface on the language runtime, invoking a device driver module to perform physical layer encapsulation, and controlling a read/write operation on the shared memory on the NIC through a dedicated interface on the NIC, where the shared memory is configured to provide shared storage for a task of the distributed application, and the shared memory can be accessed by a plurality of computing nodes running the same application.

By using the technical solution of the present invention, the network stack processing is bypassed, and the device driver module is invoked directly by the language runtime, thus the time delay brought by steps S8, S9, S17, S18 in FIG. 1 can be avoided. In addition, since the present invention bypasses the network protocol stack processing, and does not need to perform TCP/IP encapsulation on the data packet and only needs to perform physical layer encapsulation, the data packet can be transmitted according to the existing physical layer transmission model. This significantly saves the additional packet header and tail overheads brought by the TCP/IP layer data encapsulation.

Figure 3:
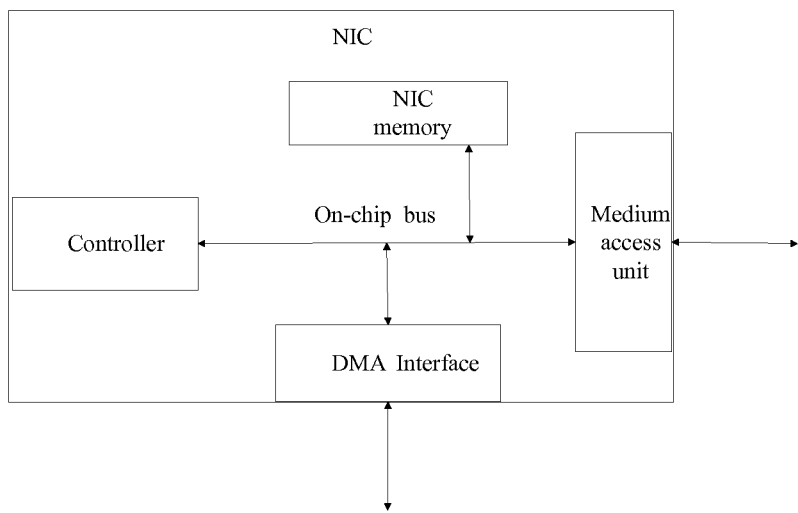
FIG. 3 illustrates a schematic diagram of an internal structure of a NIC in the prior art.

FIG. 3 shows a schematic diagram of an internal structure of a NIC in the prior art. The NIC in the prior art includes control logics, an NIC memory, a DMA interface and a medium access unit, where the control logics can be configured to be a programmable chip to control a DMA operation, so as to realize data read/write to the NIC memory. The DMA interface is connected externally to the bus of the computer node to perform a DMA operation. The medium access unit is responsible for receiving data frames from the network and transmitting data frames in the NIC memory to the network. The NIC memory is a temporary storage unit of the data frames.

Figure 4:
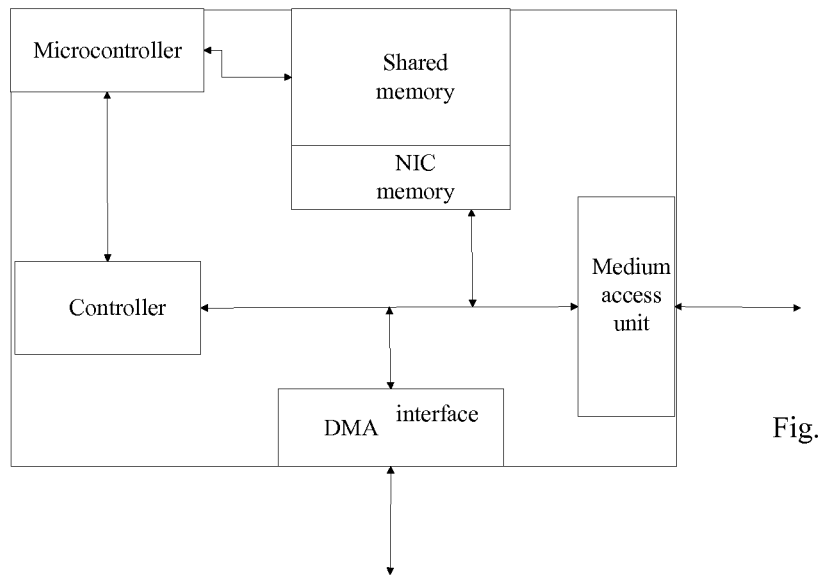
FIG. 4A illustrates a schematic diagram of the structure of an NIC according to an embodiment of the present invention.
FIG. 4B illustrates a schematic diagram of the structure of an NIC according to another embodiment of the present invention.
Figure 4:
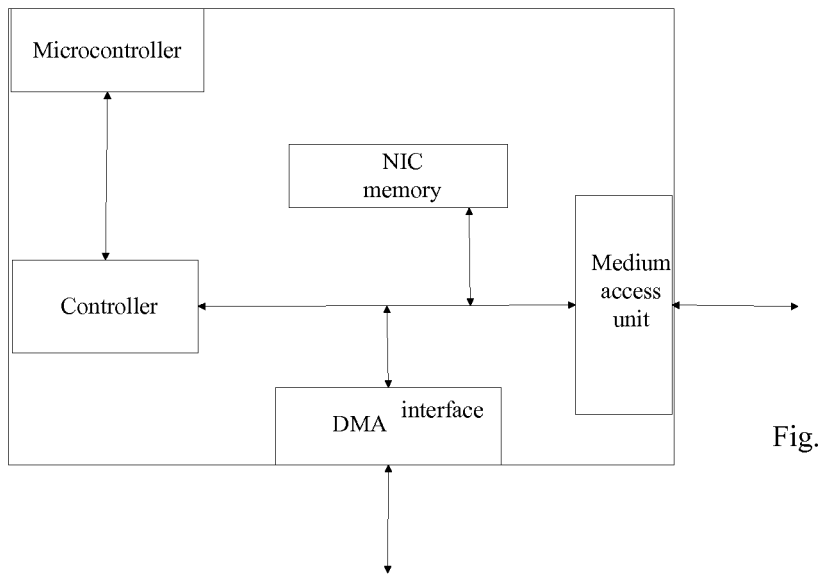

FIG. 4A shows a schematic diagram of the structure of an NIC according to an embodiment of the present invention. The NIC in FIG. 4A is added with a shared memory and a microcontroller on the basis of the structure of a current NIC. Therein, the shared memory is configured to provide shared storage for a distributed application, and the shared memory can be accessed by plural computing nodes running the same application. The microcontroller is configured to control a read/write operation on the shared memory. Furthermore, the microcontroller is configured to determine whether the shared memory supports a received read/write request, and perform the read/write operation on the shared memory when it determined that the shared memory supports the received read/write request. The microcontroller can be implemented by a simple Field Programmable Gate Array (FPGA), and not necessarily be designed as a complex general processor.

The original control logic of the NIC communicates with the upper-layer device driver module through a specific port, and similarly, the microcontroller can also communicate with the upper-layer device driver module through a specific port. Generally, the device driver module communicating with the control logics and the device driver module communicating with the microcontroller are different device driver modules.

According to an embodiment of the present invention, the NIC memory can be configured to buffer data read/written by the shared memory. According to another embodiment of the present invention, the shared memory directly performs the read/write operation with the program buffer in the local physical memory without being buffered by the NIC memory. The specific buffering process will be described in detail in the following.

According to an embodiment of the present invention, the NIC also includes a command port CMD (not shown) thereon, the command port is connected with the microcontroller and communicates with the upper-layer device driver module, and the command port is configured to receive control commands to the microcontroller, so as to realize the read/write operation on the shared memory. Furthermore, the NIC can also include a state port STAT (not shown) thereon, and the state port is connected with the microcontroller and communicates with the upper-layer device driver module, and is responsible for providing the state result of the data read/write operation on the shared memory on the NIC, so as to be read and checked by the device driver module. The command port and the state port together realize the controlling of the controller.

In different architectures, different I/O primitives can be used to accomplish port read/write. Taking the IA32 architecture as an example, assuming the port addresses of CMD and STAT are 0x4A0 and 0x4A1 respectively, the following instructions issued by the driver program can accomplish the port read/write:

```
MOV cmd_word, EAX    # move the command word into the EAX
                     register
OUT 0x4A0, EAX       # write the command word into the CMD port
IN EAX, 0x4A1        # read in state word from the STAT port
```

Figure 5:
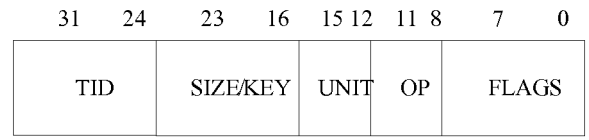
FIG. 5A illustrates a schematic diagram of a field structure of a command port according to an embodiment of the present invention.
FIG. 5B illustrates a schematic diagram of the structure of a write operation instance of a command port according to an embodiment of the present invention.
FIG. 5C illustrates a schematic diagram of the structure of an allocation operation instance of a command port according to another embodiment of the present invention.
Figure 5:
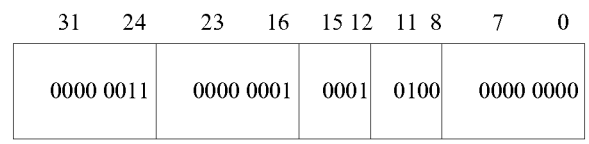
Figure 5:
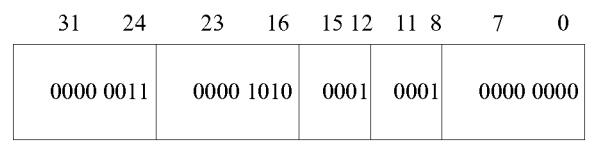

According to an embodiment of the present invention, in specific hardware implementation, the CMD port can be a 16-bit or 32-bit register that controls read/write of the on-chip storage module. FIG. 5A illustrates a schematic diagram of a field structure of a command port according to an embodiment of the present invention. In the embodiment of FIG. 5A, the CMD port is implemented as a 32-bit register, which includes a TID field, a SIZE/KEY field, a UNIT field, an OP field and a FLAGS field.

Therein, the TID field at bits 24-31 is used to indicate a task identification code (TID), and the task identification code is used to indicate to which task of the distributed application the data read/written belongs. A distributed application can include plural tasks. The present invention can apply shared memory on the NIC for each task to perform data sharing, or apply shared memory on the NIC for one or more tasks to perform data sharing. For the plural computer nodes, either the NIC of one computer node provides a common shared memory for all the tasks, or the NICs of different computer nodes provide shared memory for different tasks respectively.

The OP field at bits 8-11 is used to indicate the operation type, e.g., 0011 denotes to perform data read operation on the shared memory, 0100 denotes to perform data write operation on the shared memory, 0001 denotes to perform memory allocation operation on the shared memory, 0010 denotes to perform memory release operation on the shared memory. Therein, the read operation and write operation are two basic operations of data. The allocation operation is used to request allocating a piece of memory space before the data read/write operation, and the release operation is used to release a previously allocated memory space after the data read/write operation.

For different operation types, the meanings of the SIZE/KEY field of the command port bits 16-23 can also be different. For example, for the allocation operation, bits 16-23 store the size of the storage space requested to be allocated by the shared memory. Each allocated storage space of the shared memory will be assigned a key KEY for identifying a piece of occupied storage space. For the write operation, the read operation and the release operation, the key stored by bits 16-23 is used to denote the storage space of the shared memory to which the write operation, the read operation and the free operation correspond.

The UNIT field at bits 12-15 of the command port is used to denote allocation granularity. In an allocation operation, since bits 16-23 only have 8 bytes and the size of the storage space requested to be allocated by the shared memory that can be denoted thereby is limited, the UNIT field can realize an extension of the storage space size. According to an embodiment of the present invention, the UNIT field is used to denote a multiple of the filed SIZE. For example, for the allocation operation, if what is stored between bits 16-23 is 00000001, then when what is stored by bits 12-15 of the command port is 0001, it indicates that the storage space size of the shared memory requested to be allocated is 1×1; when what is stored in bits 12-15 of the command port is 0010, it indicates that the storage space size of the shared memory requested to be allocated is 1×2; when what is stored in bits 12-15 of the command port is 0011, it indicates that the storage space size of the shared memory requested to be allocated is 1×3, and so forth. According to another embodiment of the present invention, the UNIT field is used to indicate plural multiplies of the field SIZE. For example, when what is stored in bits 12-15 is 0001, it indicates that the storage space size of the shared memory requested to be allocated is 1×1; when what is stored in bits 12-15 is 0010, it indicates that the storage space size of the shared memory requested to be allocated is 1×8, and so forth.

Optionally, the FLAGS field at bits 0-7 of the command port is used to denote other control options, including whether the storage space of the allocated shared memory is allowed to be modified.

FIG. 5B illustrates a schematic diagram of the structure of a write operation instance of a command port according to an embodiment of the present invention. Therein, the TID field is 00000011, the KEY field is 00000001, the UNIT field is 0001, the OP field is 0100, and the FLAGS field is 00000000. FIG. 5B denotes a command port instance of executing a write data operation on a piece of storage space with a shared memory key of 1 through the CMD port for a task with a task identifier TID of 3.

FIG. 5C shows a schematic diagram of the structure of an allocation operation instance of a command port according to another embodiment of the present invention. Therein, the TID field is 00000011, the SIZE field is 00001010, the UNIT field is 0001, the OP field is 0001, and the FLAGS field is 00000000. FIG. 5C denotes that, for a task with a task identifier 3, it requests the shared memory to allocate a storage space of 10 bytes of shared memory through the CMD port.

The structural design of the CMD port can be adjusted according to the difference of specific applications, and not limited to the above-listed instances.

The structural design of the STAT port can also be adjusted according to the difference of specific applications. In an embodiment of the present invention, the structure of the STAT port includes a KEY field and a TID field to indicate the execution status of a read/write command, e.g., whether a read/write operation is executed successfully, or whether a read/write operation invokes a remote computer node. This invention does no specifically define the format of the STAT port.

Figure 6:
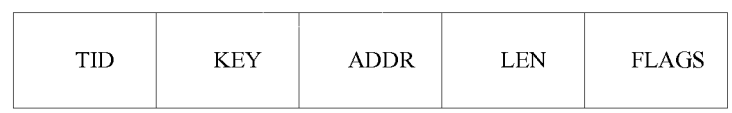
FIG. 6 illustrates a schematic diagram of the structure of an allocation table in the shared memory according to an embodiment of the present invention.

FIG. 6 illustrates a schematic diagram of the structure of an allocation table in the shared memory according to an embodiment of the present invention. In order to perform effective control on the shared memory in the NIC, according to an embodiment of the present invention, an allocation table is maintained in the shared memory. The allocation table records the tasks supported by the shared memory. Specifically, the allocation table in FIG. 6 includes a TID field, a KEY field, an ADDR field, a LEN field and a FLAGS field, where the TID field records the task identification code supported by the shared memory, the KEY field records the key to which the storage space allocated by the shared memory for the corresponding task, the ADDR field records the start address of the shared memory to which the key corresponds, the LEN field records the size of the storage space of the shared memory to which the key corresponds, and the FLAGS field records other related information. Thus, the microcontroller can, by querying the allocation table, learn whether the local shared memory has allocable space and supports the read/write operation required by the device driver module.

According to an embodiment of the present invention, the NIC can be further configured with a state switch thereon, which indicates whether the local NIC is configured with a shared memory which in an enabled working state. The microcontroller can be further configured to determine whether the local NIC is configured with a shared memory module according to the state switch. Moreover, the state in the state switch can be altered to denote whether the shared memory on the local NIC is in an enabled or disabled working state.

Furthermore, if the local NIC is configured with a shared memory, the microcontroller can determine whether the shared memory configured on the local NIC supports a certain read/write operation according to the task identification code TID in the above allocation table. This function is especially useful for the case where the NICs of plural computer nodes are all configured with different shared memories so as to support different distributed program tasks, by which a microcontroller can determine whether the shared memory configured on the local NIC is the shared memory to which a certain read/write operation is directed.

In order to indicate that the write operation is to write data into the shared memory rather than the NIC memory, or to indicate that the read operation is to read data out from the shared memory rather than the NIC memory, the device driver module writes a special identifier in the frame structure of the physical layer data while performing physical layer data encapsulation so as to indicate the packet is targeted at the shared memory. In an embodiment of the present invention, the special identifier is recorded in the type field of the physical layer packet header of the data. FIG. 7A illustrates a schematic diagram of a physical layer data frame transmitted according to the RFC894 Ethernet transmission standard. FIG. 7B illustrates a schematic diagram of a physical layer data frame transmitted according to the RFC1042 Ethernet transmission standard. Both transmission standards include a two-byte type field. The device driver module first sets the frame type of the physical layer network frame to identify the difference with a common network data packet before it writes data to the shared memory. For example, generally the type field is 0x0800 to indicate that an IP packet is carried in the data frame. The present invention can distinguish a shared memory read/write packet from a network data packet by setting the type field to 0x00FF. Other embodiments of the present invention can use other fields of the physical layer frame structure packet header to record the special identifier, or change the physical layer frame structure to add a special identifier field.

As described above, in the present invention, either a common shared memory is provided for all tasks by the NIC of only one computer node in the plural computer nodes, or different shared memories are provided for different tasks by the NICs of different computer nodes. In the former embodiment, the NIC of only one computer node among the plural computer nodes is configured with both the shared memory and the microcontroller, while the NICs of other computer nodes are merely configured with a microcontroller to realize controlling the read/write operation on the remote shared memory. FIG. 4B illustrates a schematic diagram of an NIC structure according to another embodiment of the present invention. The NIC of FIG. 4B includes control logics, a NIC memory, a media access unit, a DMA interface and a microcontroller. Different from FIG. 4A, the NIC in FIG. 4B does not include a shared memory. The microcontroller in FIG. 4B is only used to provide controlling logics to the shared memory of a remote computer node, and not used to control the local shared memory. The specific details will be described in more detail below.

In the following is described different data flows in the above two embodiments with respect to the architecture of the computer nodes.

Embodiment 1

Figure 8:
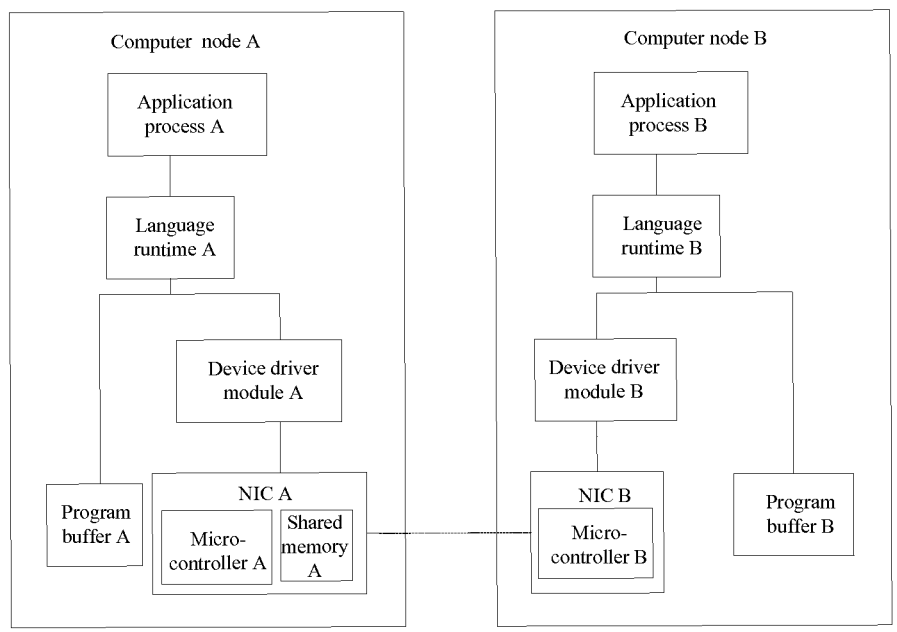
FIG. 8 illustrates a schematic diagram of a system for performing data transmission between two computer nodes according to an embodiment of the present invention.

Only One Computer Node in the Plural Computer Nodes is Configured with a Shared Memory Taking FIG. 8 as an example, the NIC A of computer node A is configured with a shared memory A, while the NIC B of computer node B is not configured with a share memory.

Embodiment 1.1

A Read/Write Operation is Issued by the Application Process of the Computer Node Configured with a Shared Memory Taking FIG. 8 as an example, assuming that the application process A of computer node A issues a data read/write request.

Embodiment 1.1.1

The Issued Read/Write Request is a Write Data Request

Taking FIG. 8 as an example, assuming that the application process A issues a write data request requesting to write a piece of data in the program buffer A into the shared memory. For the application, it is transparent whether data is stored using the shared memory.

First, the application process A provides the address of the program buffer A of the distributed application, the data to be written into the shared memory being stored in the program buffer A. The application process A invokes the language runtime A using a dedicated interface of the language runtime A to perform data writing. The language runtime A invokes the device driver module A to encapsulate the data into a physical layer data frame, including encapsulating the packet header and packet tail of the physical layer data frame. Therein the device driver module A is a device driver module dedicated to perform shared memory operations. Besides, the computer node A further includes a device driver module (not shown) corresponding to the controller in the NIC A, i.e., a device driver module used in a traditional NIC. Next, the device driver module A will invoke the traditional device driver module, so as to copy the data from the program buffer A to the NIC memory (not shown) of the NIC A. As a variation of the above embodiment, the physical layer encapsulation can also be performed by a traditional device driver module.

Next, the microcontroller A determines whether the local NIC is configured with a shared memory according to the state switch on the NIC A. In this embodiment, the microcontroller A determines that the local NIC has the shared memory. Since only one computer node in the plural computer nodes is configured with the shared memory, the object upon which the above data write request is targeted is exactly the shared memory on the local NIC.

Next, the microcontroller A copies the data packet from the NIC memory on the NIC A into the shared memory A. The above step has various implementations, one of which is to remove the packet header and packet tail of the data packet, and copy the effective data part therein into the shared memory A. In another implementation, the entire data packet is copied into the shared memory A.

To support data sharing, the storage capacity of the shared memory is usually very large, and much larger than the storage capacity of the NIC memory. In this case, if a write operation of a large amount of data is performed, it can be impossible to copy all the data to be written into the NIC memory. Therefore, it is needed to partition a large bulk of data, so that the partitioned data can be written into the shared memory B piece by piece from the program buffer A through the NIC memory. All data read from the program buffer A are finally written into the shared memory A through buffering of the NIC memory.

As a variation of the present embodiment, the device driver module A can copy data from the program buffer A into the shared memory A directly by writing to the command port of the microcontroller A. For example, the KEY field in the command port can be used to describe the address of the data to be written in the program buffer A, by which the microcontroller can be able to control copying the data at the address from the program buffer A to the shared memory A. The above manner can realize a direct data exchange between the program buffer and the shared memory, but can also bring additional control overheads.

Embodiment 1.1.2

The Issued Read/Write Request is a Read Data Request

Taking FIG. 8 as an example, assume that the application process A issues a read request, requesting to read data from the shared memory into the program buffer A.

First, the application process A provides the address of the program buffer A for receiving the data. The application process A invokes the language runtime A using a dedicated interface of the language runtime A. The language runtime A invokes the device driver module A to encapsulate the address of the program buffer A to a simple physical layer data frame. The device driver module A invokes a traditional device driver module (not shown) corresponding to the NIC memory in the NIC A, so as to copy the address of the program buffer A to the NIC memory (not shown) of the NIC A.

Next, the microcontroller A determines whether the local NIC is configured with a shared memory according to the state switch on the NIC A. In the present embodiment, the microcontroller A determines that the local NIC has the shared memory. Since only one computer node in the plural computer nodes is configured with the shared memory, the object upon which the above data read request is executed is exactly the shared memory on the local NIC.

Next, the microcontroller A copies the data from the shared memory A to the NIC memory of the NIC A, and then the controller of the NIC A copies the data from the NIC memory to the program buffer A according to the address of the program buffer A stored in the NIC memory.

As a variation of the present embodiment, the device driver module A can also directly copy the data from the shared memory A to the program buffer A by writing to the command port of the microcontroller A. In this way, the structure of the command port should be added with a field of program buffer address to indicate the address into which the data is to be written.

Embodiment 1.2

A Read/Write Request is Issued by the Application Process of a Computer Node not Configured with a Shared Memory Taking FIG. 8 as an example, assume that the application process B of the computer node B issues a data read/write request.

Embodiment 1.2.1

The Issued Read/Write Request is a Write Data Request

Taking FIG. 8 as an example, assume that the application process B issues a write data quest, requesting to write a piece of data in the program buffer B into the share memory A.

First, the application process B provides the address of the program buffer B, in which the data to be written into the shared memory is stored, of the distributed application. The application process B invokes the language runtime B by a dedicated interface on the language runtime B to perform data partition. The language runtime B invokes the device driver module B to encapsulate the data into a data frame of the physical layer, where the device driver module B is a device driver module dedicated to perform shared memory operations. Besides, the computer node B further includes a device driver module (not shown) corresponding to the controller in the NIC B, i.e., a device driver module used in a traditional NIC. Next, the device driver module B will invoke the traditional device driver module, so as to copy the data from the program buffer B to the NIC memory (not shown) of the NIC B. As a variation of the above embodiment, the physical layer encapsulation of the data can also be performed by the traditional device driver module.

Next, the microcontroller B determines whether the local NIC is configured with a shared memory according to the state switch on the NIC B. In this embodiment, the microcontroller B determines that the local NIC does not have a shared memory thereon.

Next, the microcontroller B invokes the controller on the NIC B, so as to transmit the data in the NIC memory of the NIC B to other computer nodes through the medium access unit (not shown), the other computer nodes being computer node A in the present embodiment.

Then, the NIC A of computer node A receives the data and copies it to the shared memory A. Specifically, after the NIC A receives the data, the controller of the NIC A determines whether the data is the data to be written into the shared memory by querying a special identifier in the data frame, e.g., a type field. If the data is to be written into the shared memory, then the microcontroller A further determines whether there is a locally configured share memory according to the state switch on its own NIC. In the present embodiment, the microcontroller A determines that a shared memory A is configured locally. Since only one computer node in the plural computer nodes is configured with a shared memory, the object upon which the above data write request is executed is exactly the shared memory on the NIC A. Next, the microcontroller A writes the data into the local shared memory A.

It should be pointed out that, a data frame transmitted in a network can include a task identifier field TID and a key field KEY. The TID and KEY can be recorded in the data fields shown in FIG. 7A, 7B, and the values of TID and KEY will be recorded in the allocation table of the shared memory. As for the structure of the allocation table, refer to the above description with respect to FIG. 6.

Embodiment 1.2.2

The Issued Read/Write Request is a Read Data Request

Taking FIG. 8 as an example, assume the application process B issues a read data request, requesting to read data from the shared memory into the program buffer B.

First, the application process B provides the address of the program buffer B for receiving data. The application process B invokes the language runtime B using a dedicated interface of the language runtime B. Then, the language runtime B invokes the device driver module B to encapsulate the address of the program buffer B into a physical layer data frame. Moreover, the device driver module B invokes a traditional device driver module (not shown) corresponding to the NIC memory in NIC B, so as to copy the address of the program buffer B into the NIC memory (not shown) of the NIC B.

Next, the microcontroller B determines whether a shared memory is configured locally according to the state switch on the NIC B. In the present embodiment, the microcontroller B determines that there is no shared memory on the local NIC, and then the microcontroller B forwards the data read request to other computer nodes or simply neglects this data read request, the other computer node being computer node A in the present embodiment.

Next, the controller in the NIC A can determine whether the requested data is data stored in the shared memory by checking the field type in the data frame. If the conclusion is yes, the microcontroller A further determines whether there is a shared memory configured locally. If the further conclusion is yes, the microcontroller A parses the data read request and constructs the data in the shared memory A into a physical layer data frame. Then, the NIC A transmits the data to the computer node B. After receiving the data, the computer node B copies the data to the program buffer B under the control of the controller of NIC B, thus accomplishing the data read operation.

Embodiment 2

Figure 9:
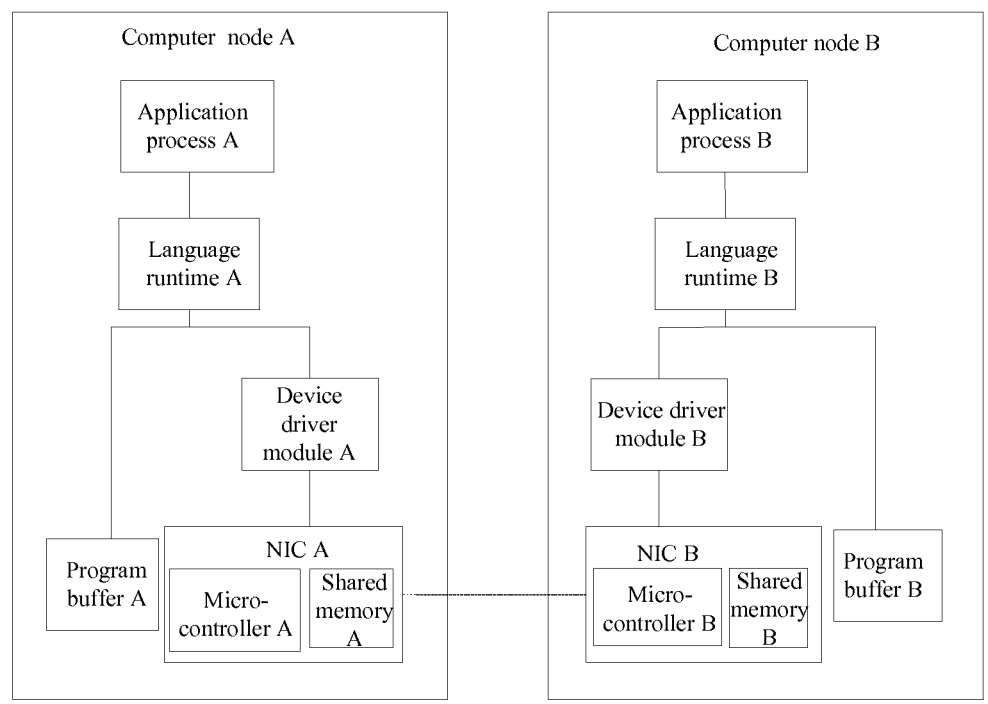
FIG. 9 illustrates a schematic diagram of a system for performing data transmission between two computer nodes according to another embodiment of the present invention.

The Plural Computer Nodes are all Configured with Shared Memories to Support Different Tasks Taking FIG. 9 as an example, the NIC A of the computer node A is configured with a shared memory A, and the NIC B of the computer node B is configured with a shared memory B. The shared memory A and the shared memory B can be used to support different tasks. Hereinafter, only the parts of the embodiment 2 different from embodiment 1 are described in detail, while the parts identical with the embodiments in embodiment 1 are merely described briefly.

Embodiment 2.1

A Read/Write Request is Issued to the Local Shared Memory

Taking FIG. 9 as an example, assume that the application process A of the computer node A issues a data read/write request, requesting to perform a read/write operation on the shared memory.

Embodiment 2.1.1

The Issued Read/Write Request is a Write Data Request

Taking FIG. 9 as an example, assume that application process A issues a write data request, requesting to write a piece of data in the program buffer A into the shared memory A.

First, the application process A provides the address of the program buffer A of the distributed application. The application process A invokes the language runtime A, which in turn invokes the device driver module A to encapsulate the data into a physical layer data frame. Next, the device driver module A will invoke the traditional device driver module (not shown) of the NIC A, so as to copy the data from the program buffer A into the NIC memory (not shown) of the NIC A.

Next, the microcontroller A determines whether the local NIC is configured with a shared memory according to the state switch on the NIC A. In the present embodiment, the microcontroller A determines that the local NIC is configured with a shared memory. Next, the microcontroller A further determines whether the shared memory A configured on the local NIC supports the write operation, i.e., whether data is to be written into this instance of shared memory A instead of the shared memories on other computer nodes, according to the task identification code TID stored in the allocation table of the shared memory A. Specifically, the microcontroller A can determine whether the write operation is to be performed on the local shared memory by comparing the task identification code TID in the allocation table with the TID field of the write command obtained by the command port of the NIC A. In the present embodiment, the microcontroller A determines that the write operation is to be performed on the local shared memory A.

Next, the microcontroller A copies the data from the NIC A memory on the NIC memory A into the shared memory A.

Embodiment 2.1.2

The Issued Read/Write Request is a Read Data Request

Taking FIG. 9 as an example, assume the application process A issues a read data request, requesting to read the data from the shared memory into the program buffer A.

First, the application process A provides the address of the program buffer A for receiving data. The application process A invokes the language runtime A. Next, the language runtime A invokes the device driver module A to encapsulate the address of the program buffer A into a simple physical layer data frame. The device driver module A invokes a traditional device driver module (not shown) corresponding to the NIC memory in the NIC A so as to copy the address of the program buffer A into the NIC memory (not shown) of the NIC A.

Next, the microcontroller A determines whether the local NIC is configured with a shared memory according to the state switch on the NIC A. In the present embodiment, the microcontroller A determines that there is a shared memory on the locale NIC. Next, the microcontroller A further determines whether the shared memory A configured on the local NIC supports the read operation, i.e., whether the data is to be read from the shared memory A instead of the shared memories on other computer nodes, according to the task identification code TID stored in the allocation table of the shared memory A.

Then, the microcontroller A copies the data from the shared memory A into the NIC memory of the NIC A, and the controller of the NIC A copies the data from the NIC memory to the program buffer A according the address of the program buffer A stored in the NIC memory, thus accomplishing the data read operation.

Embodiment 2.2

A Read/Write Request is Issued to a Remote Shared Memory

Taking FIG. 9 as an example, assume the application process A of the computer node A issues a data read/write operation, requesting to perform read/write operation on a shared memory located at a remote node B.

Embodiment 2.2.1

The Issued Read/Write Request is a Write Data Request

Taking FIG. 9 as example, assume that the application process A issues a write data request, requesting to write a piece of data in the program buffer A into the shared memory B.

First, the application process A provides the address of the program buffer A, in which the data to be written into the shared memory is stored, of the distributed application, and the application process A invokes the language runtime A. Then, the language runtime A in turn invokes the device driver module A to encapsulate the data to a physical layer data frame. Next, the device driver module A will invoke a traditional device driver module (not shown) corresponding to the controller in the NIC A, so as to copy the data from the program buffer A into the NIC memory (not shown) on the NIC A.

Next, the microcontroller A determines whether the local NIC is configured with a shared memory according to the state switch on the NIC A. In the present embodiment, the microcontroller A determines that there is a shared memory on the local NIC. Next, the microcontroller A further determines whether the shared memory A configured on the local NIC supports the write operation, i.e., whether the data is to be written into the shared memory A in stead of the shared memories on other computer nodes, according to the task identification code TID stored in the allocation table of the shared memory A. In the present embodiment, the application process A will write the data into the shared memory B.

Then, the microcontroller A invokes the controller on the NIC A, so as to transmit the data in the NIC memory of the NIC A to the computer node B through a medium access unit (not shown).

Then, the NIC B of the computer node B receives the data and copies the data to the shared memory B. Specifically, after the NIC B has received the data, the controller of the NIC B determines whether the data is the data to be written into the shared memory by querying a special identifier in the data frame, e.g., a type field. If the data is to be written into the shared memory, then the microcontroller B further determines whether a shared memory is provided locally according to the state switch on its own NIC. In the present embodiment, the microcontroller B determines that there is a shared memory B configured locally. Next, the microcontroller B further determines whether the shared memory B configured on the local NIC supports the write operation, i.e., whether the data is to be written into the shared memory B instead of the shared memories on other computer nodes, according to the task identification code TID stored in the allocation table of the shared memory B. If the conclusion is yes, the microcontroller B writes the data into the local shared memory.

Embodiment 2.2.2

The Issued Read/Write Request is a Read Data Request

Taking FIG. 9 as an example, assume the application process A issues a data read request, requesting to read data from the shared memory into the program buffer A.

First, the application process A provides the address of the program buffer A for receiving data. The application process A invokes the language runtime A. Then, the language runtime A invokes the device driver module A to encapsulate the address of the program buffer A to a simple physical layer data frame. The device driver module A invokes a traditional device driver module (not shown) corresponding to the NIC memory in the NIC A, so as to copy the address of the program buffer A into the NIC memory (not shown) of the NIC A.

Next, the microcontroller A determines whether a shared memory is configured locally according to the state switch on the NIC A. In the present embodiment, the microcontroller A determines that there is a shared memory on the local NIC. Next, the microcontroller A further determines whether the shared memory A configured on the local NIC supports the read operation, i.e., whether the data is to be read from the shared memory A instead of the shared memories on the other computer nodes, according to the task identification code TID stored in the allocation table of the shared memory A. In the present embodiment, the application process A is to read the data from the shared memory B.

Then, the NIC A transmits the data read request to the NIC B. Next, the controller in the NIC B can determine whether it is a read/write request to the shared memory, i.e., whether the requested data is data stored in the shared memory, according to the type field in the data frame. If the conclusion is yes, the microcontroller B further determines whether there is a shared memory configured locally. If the further conclusion is yes, the microcontroller B parses the data read request and constructs the data in the shared memory into a physical layer network frame. Thereafter, the NIC B transmits the data along with the physical layer network frame to the computer node A. After receiving the data, the computer node A copies the data to the program buffer A under the control of the controller of the NIC A, thus accomplishing the data read operation.

The above various embodiments described in conjunction with FIGS. 8 and 9 only schematically describe some steps of the related read/write operations in the present invention, and more detailed steps about memory allocation and release have been described generally above, and will not be repeated here.

Figure 10:
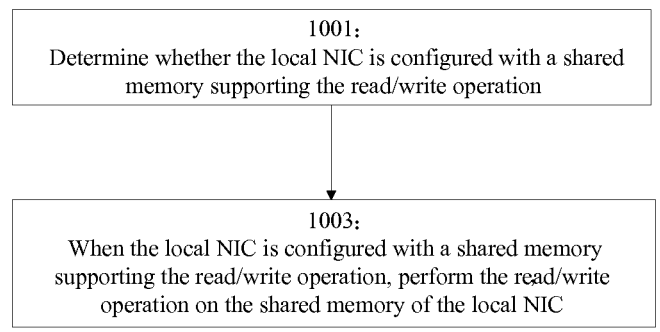
FIG. 10 illustrates a flowchart of a method for controlling a read/write operation on the shared memory of an NIC.

FIG. 10 illustrates a flowchart of a method for controlling a read/write operation on a shared memory of an NIC. In step 1001, it is determined whether a shared memory supporting the read/write operation is configured locally. In step 1003, if the shared memory supporting the read/write operation is configured locally, the read/write operation is performed on the local shared memory. The detailed process of performing a read/write operation has been described above, and will not be repeated here.

Furthermore, when there is no shared memory supporting the read/write operation configured locally, a remote shared memory is requested to perform the read/write operation. If the read/write operation is a write operation, then a physical layer encapsulation is further performed on the data to be written, and the steps for requesting a remote shared memory to perform the read/write operation further includes transmitting the encapsulated data to be written to the remote shared memory. If the read/write operation is a read operation, then perform a physical layer encapsulation on the address of the program buffer into which the data to be read is to be written, so as to be part of the data read request transmitted to the remote, and the step for requesting the remote shared memory to perform the read/write operation further includes transmitting the encapsulated data read request to the remote shared memory. The detailed process of the above operations has been described above and will be omitted here.

Figure 11:
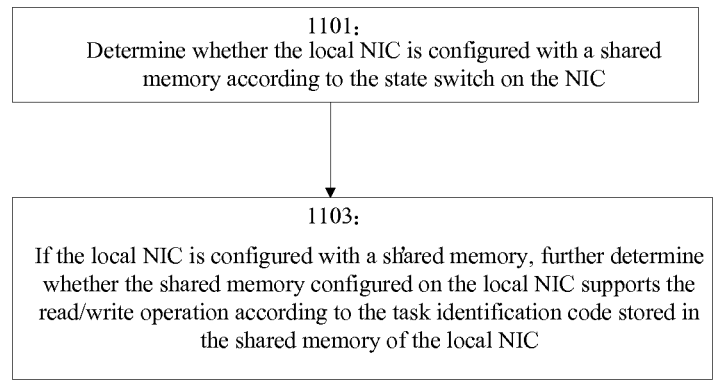
FIG. 11 illustrates a flowchart of a method for determining whether there is a locally configured shared memory supporting a read/write operation according to an embodiment of the present invention.

FIG. 11 illustrates a flowchart of a method for determining whether a shared memory supporting the read/write operation is configured locally according to an embodiment of the present invention. First, in step 1101, it is determined whether the local NIC is configured with a shared memory according to the state switch on the NIC. Then in step 1103, if the local NIC is configured with a shared memory, it is further determined whether the shared memory configured on the local NIC supports the read/write operation according to the task identification code stored in the shared memory. More detailed descriptions of the above two determination steps have been described above and will be omitted here.

Figure 12:
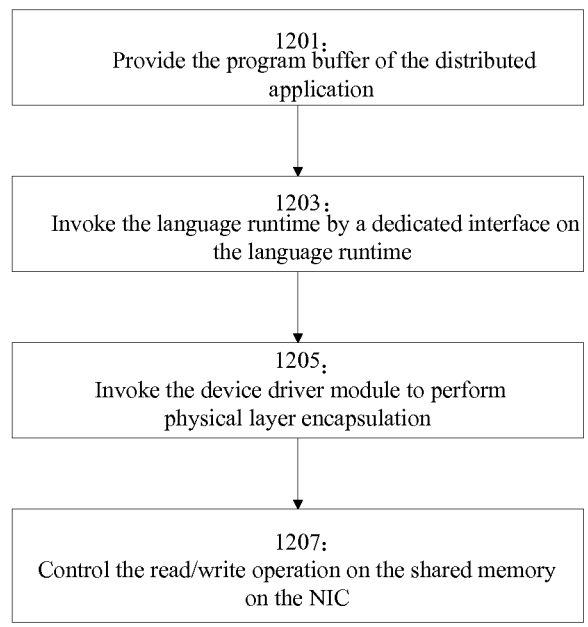
FIG. 12 illustrates a flowchart of a method for invocating an NIC according to an embodiment of the present invention.

FIG. 12 illustrates a flowchart of a method for invocating an NIC according to an embodiment of the present invention. In step 1201, a program buffer of the distributed application is provided; in step 1203, a language runtime is invoked by a dedicated interface on the language runtime; in step 1205, the device driver module is invoked to perform physical layer encapsulation; in step 1207, the read/write operation on the shared memory of the NIC is controlled using the above method. More detailed description of the above multiple steps have been described above and will not be repeated here.

It will be appreciated by those skilled in the art that, unless explicitly stated, the present invention can be implemented as a system, method or computer program product. Therefore, unless explicitly stated, the present invention can be implemented in the following forms, i.e., complete hardware, complete software (including firmware, resident software, microcode, etc.), or a combination of software part and hardware part which is generally called "circuit", "module" or "system" herein. Furthermore, the present invention can be implemented in the form of a computer program product embodied in any tangible medium of expression, which medium includes computer usable program code.

Any combination of one or more computer usable or computer readable mediums can be used. A computer usable or computer readable medium can be, for example, but not limited to, electric, magnetic, optical, electromagnetic, infrared or semi-conductive system, apparatus, device or transmission medium. More specific examples of a computer readable medium (a non-exhaustive list) include the following: electric connection with one or more wires, portable computer disk, hard disk, random access memory (RAM), read-only memory (ROM), erasable programmable read only memory (EPROM or flash), optical fiber, portable compact disk read only memory (CD-ROM), optic storage device, transmission medium supporting, for example, internet or internal network, or magnetic storage device. It should be noted that a computer usable or computer readable medium can even be papers or other mediums on which programs are printed, because, by electrically scanning the papers or other medium, for example, the program can be obtained in an electrical manner, and can be compiled, interpreted or processed in a proper way, and stored in a computer memory if necessary. In the context of this specification, a computer usable or computer readable medium can be any medium that contains, stores, conveys, propagates or transmits programs to be used by or associated with an instruction execution system, device or apparatus. The computer usable medium can include data signals transmitted in a baseband or as part of a carrier, and embodying computer usable program code. The computer usable program code can be transmitted through any appropriate mediums, including but not limited to wireless, cable, optical fiber, RF.

The computer program code for performing the operations of the present invention can be written in any combination of one or more programming languages, which include object-oriented programming languages such as Java, Smalltalk, C++, as well as conventional procedural programming languages such as "C" programming language or similar programming languages. The program code can be executed entirely on a user computer, or executed partially on a user's computer, or executed as an independent software package, or executed partially on a user computer and partially on a remote computer, or executed entirely on a remote computer or server. In the latter case, the remote computer can be connected to the user's computer through any kind of networks, including local area network (LAN) or wide area network (WAN), or can be connected to external computers (e.g., through the Internet using an internet service provider).

The present invention is described above by referring to the flowcharts and/or block diagrams of the method, apparatus (system) and computer program product according to embodiments of the present invention. It should be appreciated that, each block of the flowcharts and/or block diagrams and the combination of the blocks in the flowcharts and/or block diagrams can be implemented by computer program instructions, which can be provided to a general-purpose computer, a dedicated computer or processors of other programmable data processing devices, so as to produce a machine, which enables to produce an apparatus for implementing the functions/operations specified in the blocks of the flowcharts and/or block diagrams through executing the instructions by the computer or other programmable data processing device.

The computer program instructions can also be stored in a computer readable medium that is capable of instructing a computer or other programmable data processing devices to operate in a specific way, by which the instructions stored in the computer readable medium produce a manufactured product including instruction means for implementing the functions/operations specified in the blocks of the flowcharts and/or block diagrams.

The computer program instructions can also be loaded in a computer or other programmable data processing devices to enable the computer or other programmable data processing devices to perform a series of operation steps, to produce computer-implemented processes, so that the instructions executed on the computer or other programmable data processing devices provide a process of implementing the functions/operations specified in the blocks of the flowcharts and/or block diagrams.

The flowcharts and block diagrams in the accompanying drawings illustrate the architectures, functions or operations that can be implemented according to the system, method or computer program products of the various embodiments of the present invention. In this regard, each block in the flowcharts or the block diagrams represents a module, a program segment or part of the code, said module, program segment or part of the code includes one or more executable instructions for implementing the specified logic functions. It should be also noted that, in some alternative implementations, the functions indicated in the blocks can occur in a different order from that is indicated in the blocks. For example, two blocks illustrated consecutively can actually be performed in parallel substantially, and sometimes can also be performed in a reverse order, which depends on the functions involved. It should also be noted that, each block in the block diagrams and/or the flowcharts and the combination of blocks in the block diagrams and/or flowcharts can be implemented by a dedicated hardware-based system that perform specified functions or operations, or can be implemented by a combination of dedicated hardware and computer instructions.

The terminology used herein is only for describing specific embodiments, and not intended to limit the present invention. The singular forms of "one" and "the" used herein are intended to include plural forms, unless explicitly stated otherwise in the context. It should also be appreciated that, when the word "include" is used herein, it means the existence of the indicated features, entities, steps, operations, units and/or components, but does not exclude the existence or addition of one or more other features, entities, steps, operations, units and/or components, and/or the combination thereof.

Equivalent alternatives of the corresponding structures, materials, operations and all the functionally defined means or steps in the claims are intended to include any structures, materials or operations for executing the functions in combination with other units specifically stated in the claims. The objective of the given description of the present invention is to illustrate and describe, and not exhaustive, nor to limit the present invention to the described forms. For those of ordinary skill in the art, it is obvious that can modifications and variations can be made without departing from the scope and spirit of the present invention. The selection and description of the embodiments are for the purpose of best explaining the principles and actual application of the present invention, so that those of ordinary skill in the art can understand that the present invention can have various implementations with all kinds of variations suitable for the desired specific purposes.

The invention claimed is:

1. A method for controlling a for controlling a read/write operation on a shared memory of a network interface card, wherein said shared memory is configured to provide shared storage for tasks of a distributed application, and said shared memory is accessed by a plurality of computing nodes executing a same task, said method comprising:
controlling a read/write operation on a shared memory on a network interface card;
determining whether a local network interface card is configured with the shared memory supporting said read/write operation further comprising:
determining whether the shared memory configured on the local network interface card supports the read/write operation according to a task identification code stored on the shared memory on the local network interface card if the local network interface card is configured with the shared memory;

performing the read/write operation to the shared memory on the local network interface card through a buffer of the memory of the local network interface card;

when the local network interface card is configured with the shared memory supporting said read/write operation, wherein said shared memory is configured to provide shared storage for tasks of a distributed application, and said shared memory is accessed by a plurality of computing nodes through a separate path executing a same task.

2. The method of claim 1, wherein the step of determining whether the local network interface card is configured with the shared memory supporting said read/write operation comprises:

determining whether the local network interface card is configured with the shared memory according to a state switch on the network interface card.

3. The method of claim 1, further comprising:

requesting a shared memory on a remote network interface card to perform the read/write operation when there is no shared memory supporting said read/write operation configured on the local network interface card.

4. The method of claim 3, wherein if said read/write operation is a write operation, then said step of requesting a shared memory on a remote network interface card to perform the read/write operation further comprises:

transmitting data to be written to the shared memory on the remote network interface card.

5. The method of claim 3, wherein if the read/write operation is a read operation, then said step of requesting a shared memory on a remote network interface card to perform the read/write operation further comprises:

transmitting a data read request to the shared memory on the remote network interface card.

6. The method of claim 1, wherein the step of performing the read/write operation on the shared memory on the local network interface card further comprises:

directly performing said read/write operation between the shared memory on the local network interface card and a program buffer outside the local network interface card.

7. The method of claim 1, further comprises:

performing physical layer encapsulation on the data to be written if said read/write operation is a write operation.

8. The method of claim 1, further comprises: performing physical layer encapsulation on a program buffer address of the program buffer into which the data to be read out is to be written if said read/write operation is a read operation.

9. A method for invoking a network interface card, the method comprising:

providing a program buffer of a distributed application;

invoking a language runtime through a dedicated interface on the language runtime;

invoking a device driver module to perform physical layer encapsulation; and controlling a read/write operation on a shared memory of the on a network interface card by a method comprising:

determining whether a local network interface card is configured with a shared memory supporting said read/write operation; and performing the read/write operation to the shared memory on the local network interface card when the local network interface card is configured with the shared memory supporting said read/write operation;

wherein said shared memory is configured to provide shared storage for tasks of a distributed application; and wherein said shared memory is accessed by a plurality of computing nodes through a separate path executing a same task.

* * * * *